(12) United States Patent
Wintsch et al.

(10) Patent No.: US 8,424,406 B2
(45) Date of Patent: Apr. 23, 2013

(54) ACTUATOR HAVING A REDUCTION GEAR FOR A FINAL CONTROLLING ELEMENT FOR REGULATING A STREAM OF GAS OR FLUID

(75) Inventors: Christoph Wintsch, Bassersdorf (CH); Beat Weber, Zurich (CH); Mario Fiorucci, Zurich (CH); Andi Furrer, Wetzikon (CH)

(73) Assignee: Belimo Holding AG, Hinwil (CH)

( * ) Notice: Subject to any disclaimer, the term of this patent is extended or adjusted under 35 U.S.C. 154(b) by 949 days.

(21) Appl. No.: 12/092,540

(22) PCT Filed: Oct. 30, 2006

(86) PCT No.: PCT/CH2006/000606
§ 371 (c)(1),
(2), (4) Date: Sep. 29, 2008

(87) PCT Pub. No.: WO2007/051332
PCT Pub. Date: May 10, 2007

(65) Prior Publication Data
US 2009/0301238 A1    Dec. 10, 2009

(30) Foreign Application Priority Data
Nov. 3, 2005  (CH) ........................................ 1762/05

(51) Int. Cl.
*H02K 7/116* (2006.01)
*F16H 1/04* (2006.01)

(52) U.S. Cl.
USPC ........................................ 74/421 A; 74/422

(58) Field of Classification Search ................ 74/412 R, 74/413, 414, 421 A, 421 R, 422, 89.37
See application file for complete search history.

(56) References Cited

U.S. PATENT DOCUMENTS

| 1,339,052 | A | | 5/1920 | Bauer |
| 3,147,629 | A | * | 9/1964 | Michalec ........................ 74/10.2 |
| 3,434,356 | A | | 3/1969 | Weiss |
| 3,762,523 | A | | 10/1973 | Thorsby |

(Continued)

FOREIGN PATENT DOCUMENTS

| CH | 614507 A5 | 11/1979 |
| CH | 623672 A5 | 6/1981 |
| FR | 2584850 A | 1/1987 |
| WO | 2005/090831 A | 3/2005 |

*Primary Examiner* — Justin Krause
(74) *Attorney, Agent, or Firm* — Thaddius J. Carvis

(57) ABSTRACT

An actuator is described with a prestressed reduction gear, which acts via a drive organ, particularly in the form of a drive segment, of a linear drive or a drive spindle upon an actuator for regulating a gas or fluid flow, particularly in the fields of heating ventilation, air-conditioning and fire and smoke protection. Actuating movement is limited by end stops. At least one inner end stop on the housing side limits the rotational freedom of an end wheel, which is in a positive fit with the drive organ, up to more than a full rotation. In a prestressed reduction gear, a switching device g can comprise two spur gears which have identical diameter and can be driven in the opposite direction for changing the M direction of movement of the drive organ, each of which have a pinion which can be displaced in the axial direction. The pinions are in each axial position in a positive fit with the drive organ. One of the two pinions, respectively, can be locked in a torque fixed manner with one of the two pinions having the same diameter.

22 Claims, 9 Drawing Sheets

U.S. PATENT DOCUMENTS

Figure 1:
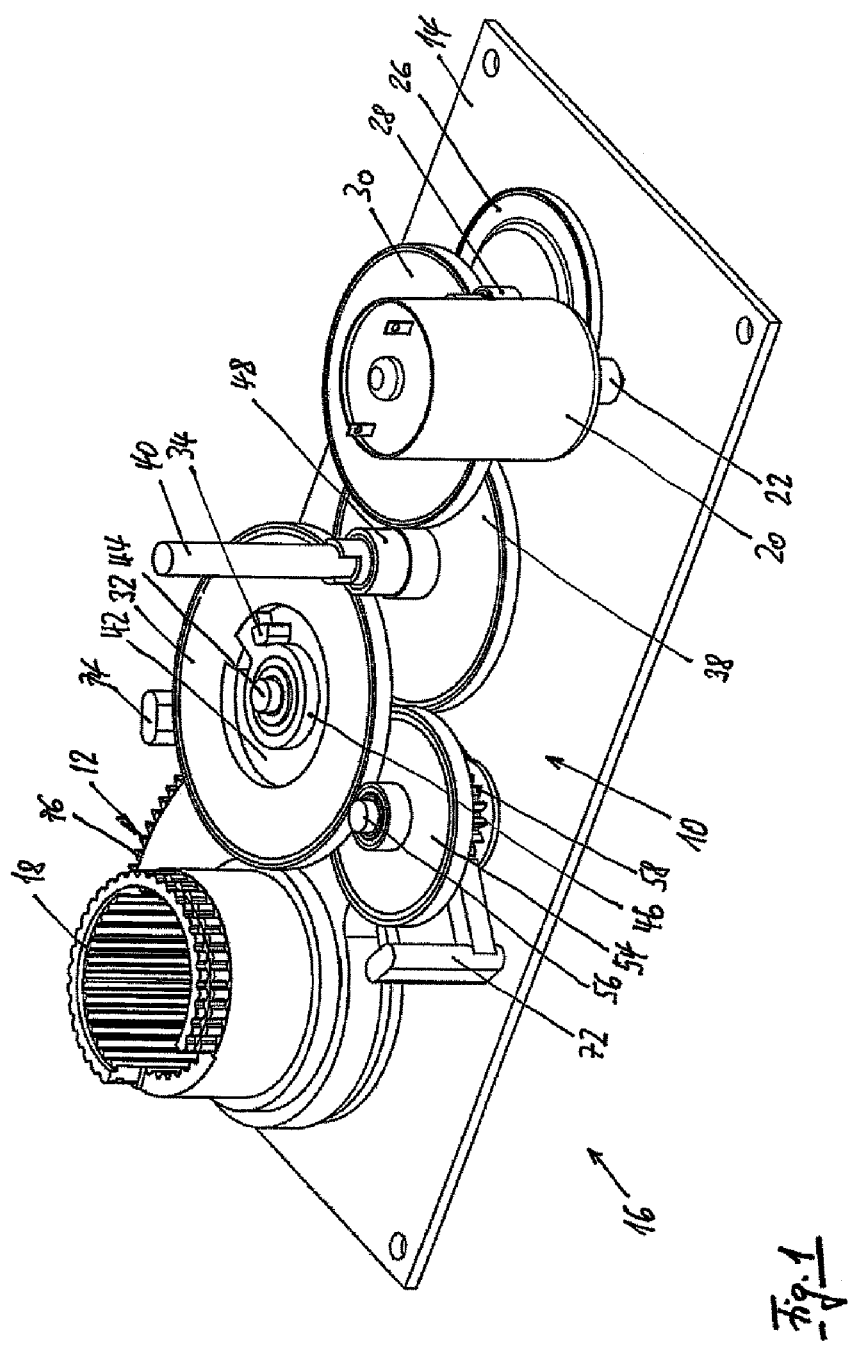

| | | | |
|---|---|---|---|
| 4,669,578 A * | 6/1987 | Fukamachi | 185/40 R |
| 5,657,664 A | 8/1997 | Birchmeier | |
| 6,497,162 B2 * | 12/2002 | Spurr | 74/421 A |
| 7,069,803 B2 * | 7/2006 | Schunke et al. | 74/421 R |
| 7,395,733 B2 * | 7/2008 | Liu | 74/501.6 |
| 2005/0109142 A1 * | 5/2005 | Schunke et al. | 74/421 A |
| 2007/0170385 A1 | 7/2007 | Furrer | |

* cited by examiner

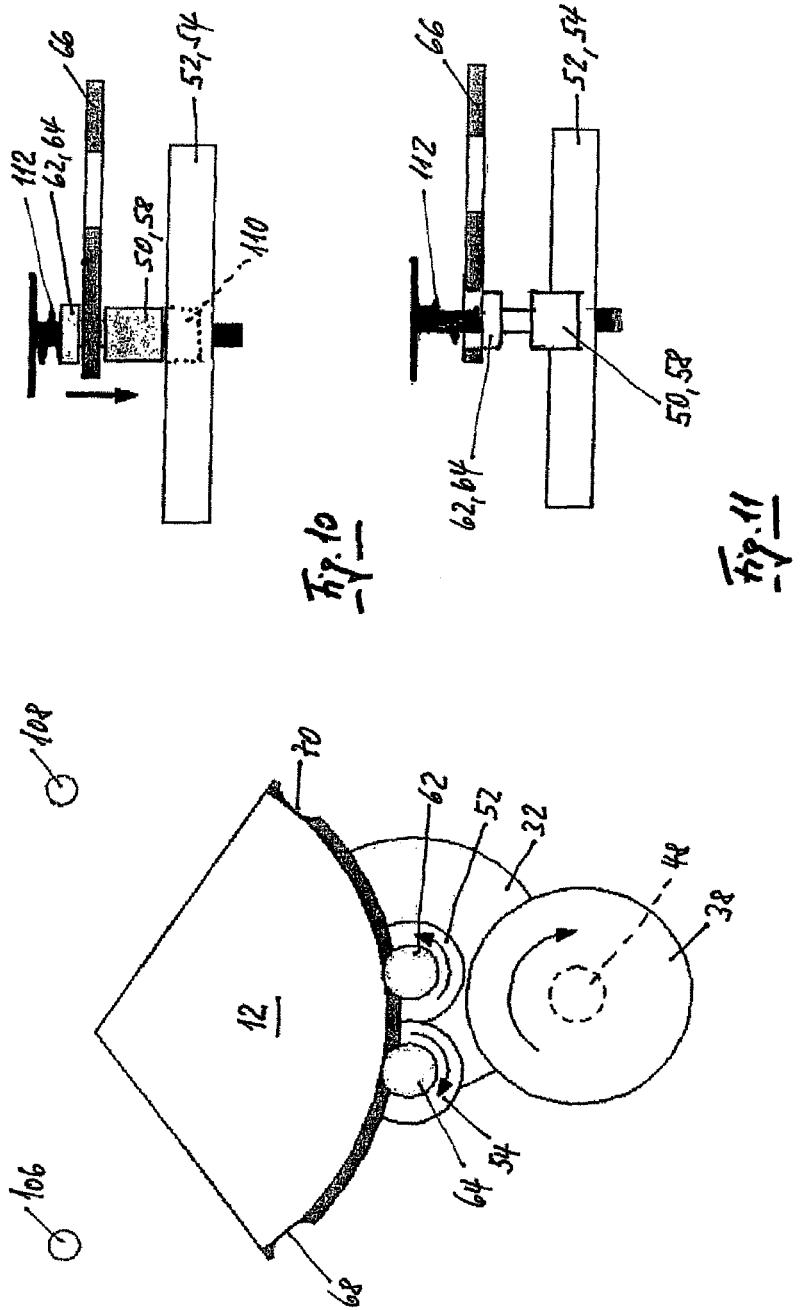

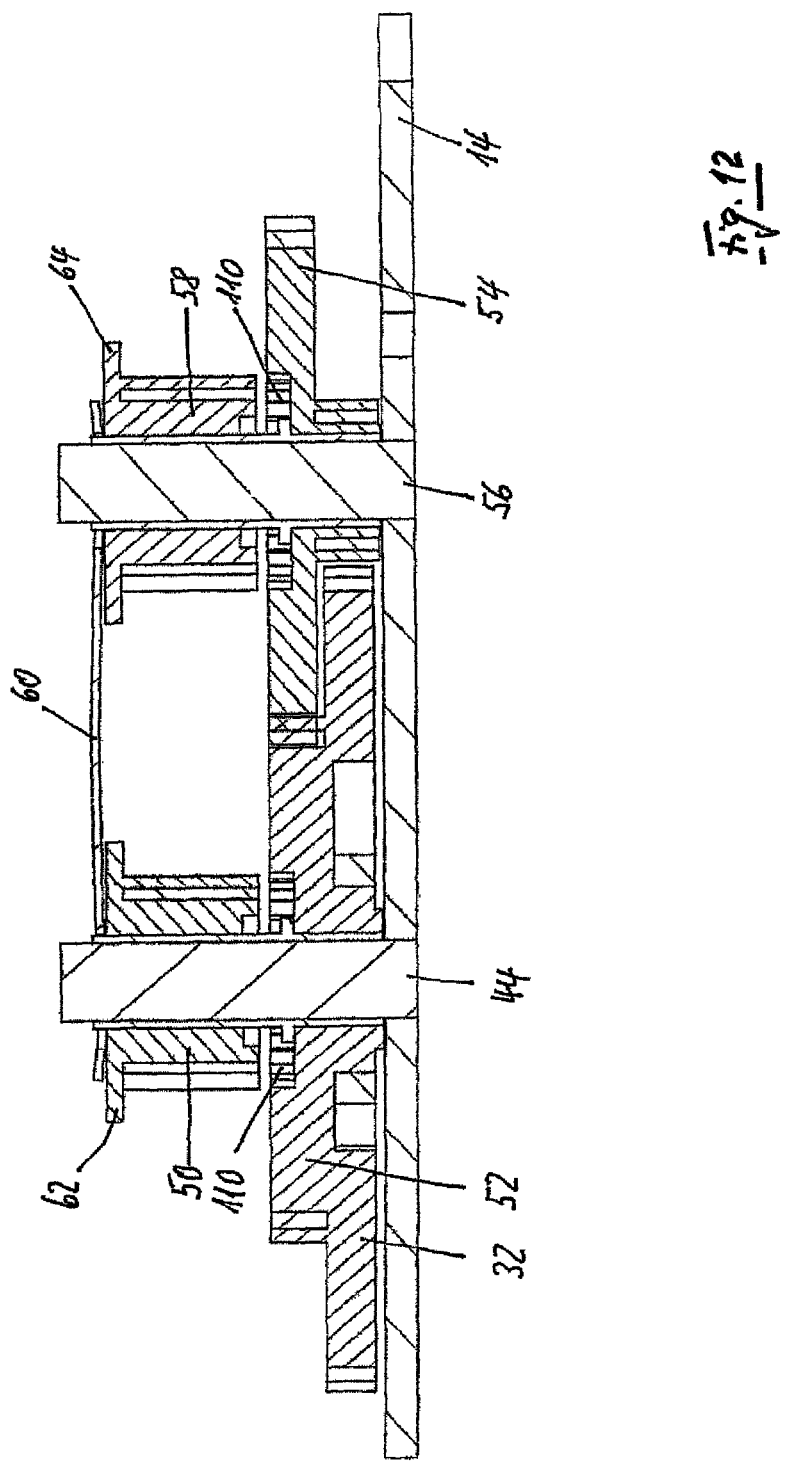

ACTUATOR HAVING A REDUCTION GEAR FOR A FINAL CONTROLLING ELEMENT FOR REGULATING A STREAM OF GAS OR FLUID

The invention relates to an actuator having a reduction gear, which is even prestressed and which acts via a drive element, in particular in the form of a drive segment, of a linear drive or of a drive spindle, on a final controlling element for regulating a stream of gas or fluid, in particular in the field of HVAC, fire or smoke protection, wherein the actuating movement is limited by end stops.

Electrically activated actuators for motorizing final controlling elements in heating, ventilating and air conditioning systems (HVAC systems) have been used for more than 30 years. HVAC final controlling elements ensure economic regulation of the volume flow of gases or fluids, in particular of air and water. As they are a compact unit, they expediently comprise not only the drive but also pressure sensors and regulators, all combined in one device.

Ventilation systems are being increasingly installed in buildings, in particular residential buildings, office buildings, commercial buildings and industrial buildings, generally combined with fire and smoke protection devices. For example, in ventilation systems the regulation of volume flow with pivotable air flaps plays an essential role, and in water and sewerage systems the drive of valves with a torque or a linear movement is essential. The volume flow is measured with a suitable measuring instrument, for example with the NMV-D2M from Belimo Automation AG, CH-8340 Hinwil, which is embodied as a compact unit with a drive, pressure sensor and regulator, and the measured values are passed on to an electronic system.

In order to move a flap in a ventilation system or a valve in a water pipe system, comparatively weak motors activate regulating elements with large areas or large volumes. Precise and stable adjustment is possible only with a very strong reduction gear. Numerous revolutions of the shaft of an electric motor are necessary to activate the actuator. The electronics processes the control signals and actuates the electric motor.

CH 614507 A5 describes an actuator with an electric motor and a reduction gear for a ventilation system. Said actuator can be plugged on to a flap axle or valve axle. The last toothed gear element, referred to as drive element here, is embodied as a toothed segment and is provided with an axially secured hollow shaft. After end stops, which restrict the angle of rotation of the toothed drive segment, have been reached, the electric motor can remain switched on. The described actuator is used in air flaps, mixing faucets and throttle valves in heating systems and ventilation systems. The described reduction gear is embodied on an equipment-specific basis.

WO 2005/090831 A1 describes a reduction gear which is of modular design and which comprises a primary gear with at least one drive motor and a secondary gear with a drive. The two gear modules are detachably connected to one another. By virtue of the modular design of the reduction gear composed of the primary gear and secondary gear, a wide variety of equipment can be produced with a small number of assemblies.

In many cases, reduction gears which are prestressed by means of a spring drive are used for systems which have ventilation flaps or valves and which meet the safety regulations. In the event of a power failure or some other kind of defect, the stored spring energy moves the ventilation flap or the valve into a defined safety position. Owing to the defined direction of action of the prestressed internal spring, the drives are generally of symmetrical design. When the actuator is mounted, it is defined which direction it will move when the power fails in that the actuator is rotated, for example, through 180°. By virtue of the symmetrical design of the actuator, operator control elements, for example a switch, must always be accessible from both sides of the actuator. This may be avoided by using a mechanical switching mechanism because in the case the drive can be constructed and operated on one side. This is implemented, for example, in the following publication.

U.S. Pat. No. 5,657,664 describes a transmission for an actuator which is equipped with a spring return feature. It operates with two drive segments. A coupling sleeve is arranged in an annular gap between the drive shaft and two wheels arranged on the same rotational axis, said coupling sleeve being detachably connected to the drive shaft. The rotational direction of the drive shaft can be changed by replacing the coupling sleeve. The formation of two drive segments is, as mentioned, disadvantageous.

The present invention is based on the object of providing actuators of the type mentioned at the beginning which include an improved concept for the inner end stops of the drive and/or the change in the direction of movement of the drive element.

The object is achieved according to the invention in accordance with a first embodiment in that at least one inner end stop which is provided on the housing limits the rotational freedom of a stop wheel, in positively locking engagement with the drive element, to more than one full revolution, and developed embodiments of the end stop are the subject matter of dependent patent claims.

According to all the known embodiments, two end stops are arranged for the drive element, in particular for a toothed drive segment. The solution according to the invention permits, in the position of rest, the load-free switching of the rotational direction even if the reduction gear is already prestressed. Inner stops are of considerable significance for correct functioning of a spring return drive:

in order to be able to maintain a predefined minimum spring prestress at the lower end of the operating range, and in order to limit the operating range at the upper end.

The forces which are to be taken up by the end stops in the region of the stop wheel are, thanks to the relatively small step down ratio, smaller than the forces which hitherto had to be taken up by the drive element, in particular by a toothed drive segment. The end stops can therefore be given smaller and weaker dimensions.

The restriction of the rotational freedom of the stop wheel with at least one inner end stop which is provided on the housing can be achieved in a wide variety of ways, some of which are explained in more detail.

The arrangement of at least one freely rotatable trailing ring which is coaxial with respect to the drive wheel permits the stop wheel to rotate through more than 360° but in a restricted fashion. With a trailing ring it is possible to achieve virtually two complete revolutions of the stop wheel. The full freedom of movement of 720° is reduced only by the width of an end stop and of a transmission cam of the trailing ring. It is possible to arrange a plurality of trailing rings which are located one in the other and/or one on top of the other in a coaxial fashion with respect to the stop wheel and which are each arranged an inner and/or outer or lower and/or upper transmission cam in the radial direction. When there are n trailing rings, the stop wheel can carry out n+1 free revolutions, in each case reduced by the aforementioned width of the end stop, and the n transmission cams, wherein n is a positive integer >0.

According to a first variant with trailing rings, the housing of the step down gear has a beaker-shaped cutout which is coaxial with respect to the shaft of the stop wheel and has a radially inwardly protruding stop cam which serves as an end stop for the outer transmission cam of a single trailing ring or the outermost of a plurality of trailing rings. At least one trailing ring with, in each case, one radially outwardly protruding transmission cam and one radially inwardly protruding transmission cam and a spur wheel of the stop wheel with a radially outwardly protruding driver cam for the inner transmission cam of a single trailing ring or the innermost of a plurality of trailing rings is arranged in the cutout. When there are a plurality of trailing rings, the respective outer transmission cam acts on the respective inner transmission cam of the next largest trailing ring and in this way transmits the torque until the stop wheel has reached the limit of free rotateability. As mentioned, a plurality of trailing rings can also be arranged one on top of the other.

According to a second variant with trailing rings, the stop wheel has an end-side, coaxial, beaker-shaped cutout with a radially inwardly protruding driver cam. In the opening there is at least one trailing ring with, in each case, one radially outwardly and inwardly or downwardly and upwardly protruding transmission cam, and a coaxial tube which is rigidly attached to the housing or a corresponding bolt with an outwardly protruding end stop for the inner transmission cam of the trailing ring or of the innermost trailing ring has, wherein, when there are a plurality of trailing rings, the respective inner transmission cam impacts against the respective outer transmission cam of the next smallest trailing ring. According to this variant, it is also possible for a plurality of trailing rings to be arranged one in the other and/or one on top of the other.

In the two preceding sections, two inverse solutions are described, with the drive according to the first variant being basically provided from the inside toward the outside, and according to the second variant from the outside to the inside.

According to a third variant with trailing rings, the stop wheel has in turn an end-side coaxial, beaker-shaped cutout with a radially inwardly protruding driver cam. A trailing ring with a radially outwardly protruding transmission cam for the driver cam and a stop cam, which is provided on the housing and is arranged on the outside of the trailing ring, is arranged for the transmission cam. The driver cam of the stop wheel can be rotated with play by means of the stop cam which is fixed to the housing. In other words, the inner face of the driver cam is somewhat further removed from the rotational axis of the stop wheel than the outer face of the stop cam which is provided on the housing and which serves as an end stop.

The description of the drawing also indicates practical implementation possibilities for limiting the free rotateability of the stop wheel without trailing rings, specifically by means of a disc-shaped limiting gate with spiral guide, a toothed rack and a spindle wheel.

As already mentioned, the reduction gear or step down gear of an actuator is preferably prestressed, and this is preferably done by means of a spring wheel which engages with the pinion of the stop wheel in a positively locking fashion, i.e. meshes with the pinion of the stop wheel. A helical spring which is composed, for example, of a flat spring steel ribbon is expediently used.

According to a further variant, a prestressed reduction gear which is of modular design and can be exchanged with the stop wheel as an interface with the drive element is arranged in a housing which is embodied in a way which is specific for its use. As already mentioned, the toothed drive element is, in particular, a drive segment, a linear drive or a drive spindle. For specific embodiments of such modules, which are also constructed with a plug-on design, reference is made to WO 2005/090831 A1.

Plug-in modules with an interface in the region between the stop wheel and the drive element preferably have a switching device for changing the direction of movement of the single drive element. At least one inner end stop is arranged in the module and it can be plugged on in a prestressed fashion and expediently snapped into place.

The object of the invention is achieved with respect to a prestressed actuator according to a further embodiment in that a switching device for changing the direction of movement of the drive element has two spur gears which can be driven in opposing directions and each have an identical diameter each have a shifting pinion which can be displaced in the axial direction of said spur gears and which engage in a positively locking fashion with the drive element in each axial position, wherein in each case one of the two shifting pinions can be latched fixedly in terms of torque to one of the two spur gears with the same diameter. Specific embodiments and developments of the actuator drive with the switching device are the subject matter of dependent patent claims.

A coaxial cutout with the cross-sectional shape of the shifting pinions is preferably formed from the two spur gears with the same diameter. The one of the two spur gears preferably has a smaller diameter than the stop wheel and is formed in one piece with it or is fixedly connected thereto, and the other spur gear is an intermediate gear. The two spur gears rotate in opposite directions with the same angular speed. Depending on which shifting pinion is lowered and is in positively locking engagement with the respective spur gear, the drive element is moved in one direction or the other.

The two shifting pinions which, in each position, mesh with the toothed drive element for the final controlling element are expediently prestressed in their axial direction, in particular with a leaf spring or a helical compression spring. A shifting gate which runs along the teeth of the drive element guides the two shifting pinions which are pressed onto the shifting gate by the prestressing force of the spring.

The shifting gate respectively has, at its ends, cutouts corresponding to the diameter of the shifting pinion or its flange in the upper end region. In this end position, a prestressed shifting pinion is pressed into the cutout provided in the respective gear wheel, and the drive element which is pivoted out of the end position is moved by the shifting pinion which is now entrained by the positively locking engagement. The second shifting pinion remains without a drive but freely rotates in an entrained fashion.

In the aforementioned position at the end of the drive element, the shifting pinion can be lifted again counter to the pressing force of the spring and be pushed on to the shifting gate with prestress due to the pivoting of the drive element.

If the two shifting pinions were to engage simultaneously in a positively locking fashion with the spur gears rotating in the opposite direction, the gear would become locked. This situation is therefore avoided or is made impossible using suitable means.

According to one particularly advantageous embodiment, the actuator according to the invention with a shifting device for changing the directional movement of the drive element has an end stop which is provided at least on the housing, in the region of one of the two spur gears which rotate in opposite directions and have the same diameter. The rotational freedom of the respective spur gear, generally of the stop wheel, is limited to more than one complete revolution through 360°.

In all the embodiments described above, the actuator is expediently premounted and prestressed in the form of a module without a drive element, i.e. without a toothed drive segment, linear drive or drive spindle. This module is arranged in a housing which is specific for its use and said module can also be mounted on a common mounting plate together with a drive element.

The advantages of the invention can be summarized as follows:

At least one inner end stop which is provided on the housing simplifies the installation of a shifting mechanism for selecting the direction of spring return with a one-sided construction, in particular with a module design. The drive does not have to be rotated through 180° of its longitudinal axis in order to specify the direction of the spring return. Thanks to this solution, the operator control elements do not need to be accessible from both sides with the drive. A reduction gear unit which is embodied as a module can be premounted and prestressed as far as the stop wheel by the motor. The drive element can be selected on an application specific basis, in particular as a drive segment, as a linear drive which is embodied as a toothed rack or as a drive spindle. The axial shifting movement with the shifting gate and the shifting pinions functions reliably and requires only small shifting travel values. In the case of the drive segment, the segment angle can be significantly below 180°, and only a single segment is necessary.

The user is provided with a prestressed actuator with a selection of the rotational direction with a drive element in the central position or guides the drive element into this position before an actuator module is fitted on. The, for example, segment-shaped drive element is freely rotatable within the end positions. The drive element is then guided manually into the left-hand or right-hand end position where a prestressed actuator pinion engages. If there is an incorrect selection of the rotational direction, the engaged actuator pinion can be decoupled in the end position using a resetting key and the other actuator pinion can be engaged in the other end position of the drive element.

Figure 2:
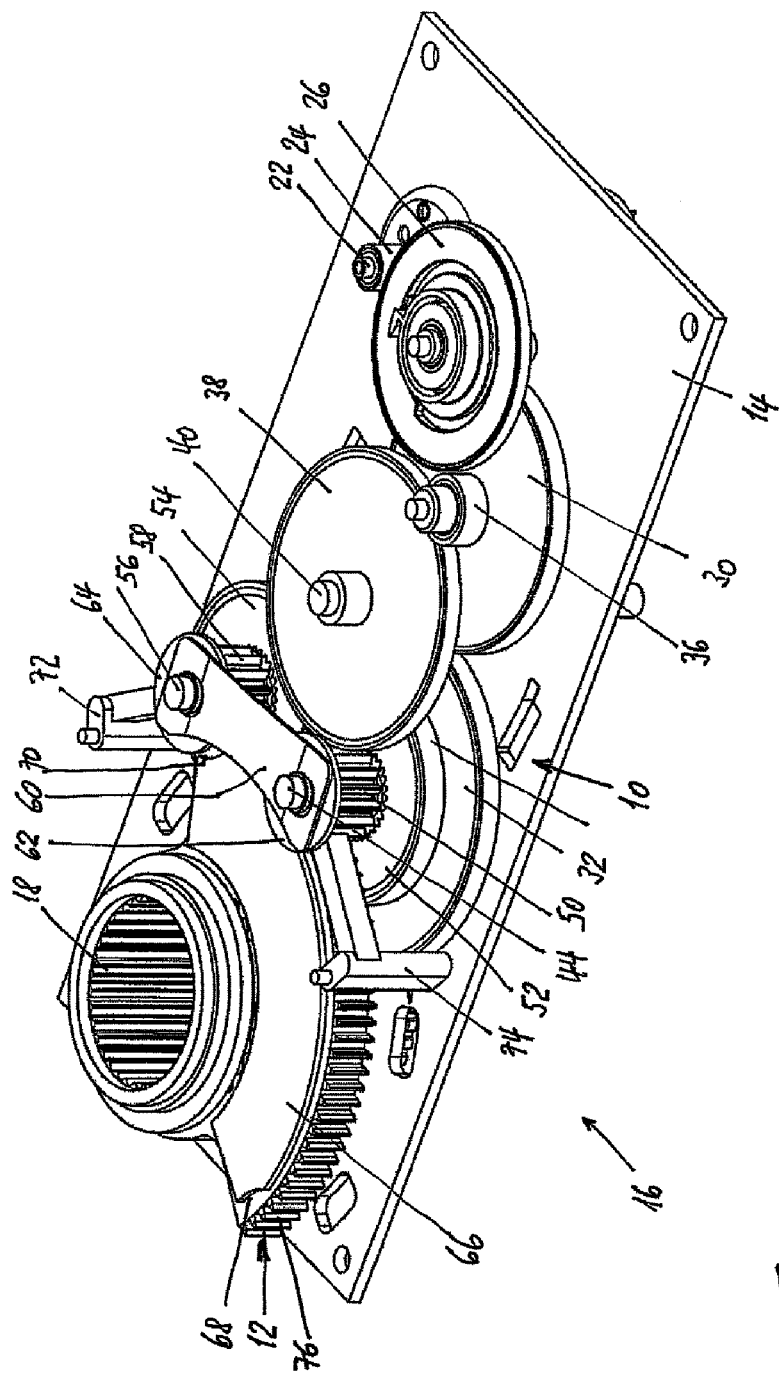
Figure 3:
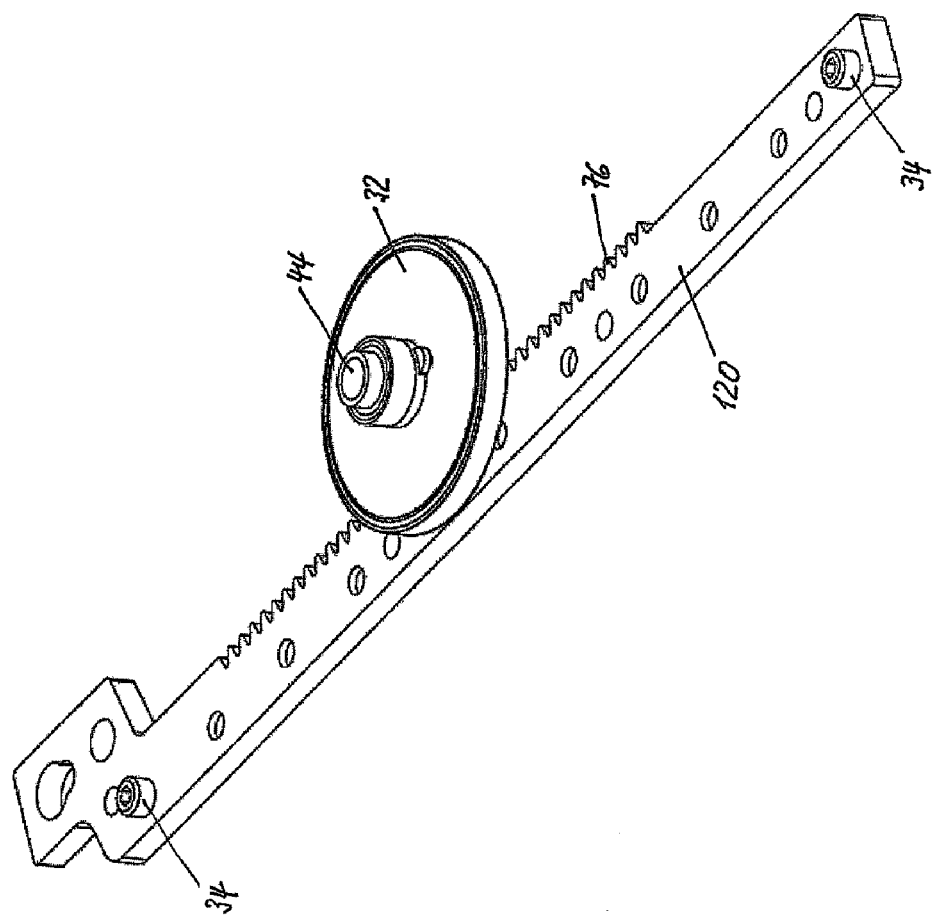
Figure 4:
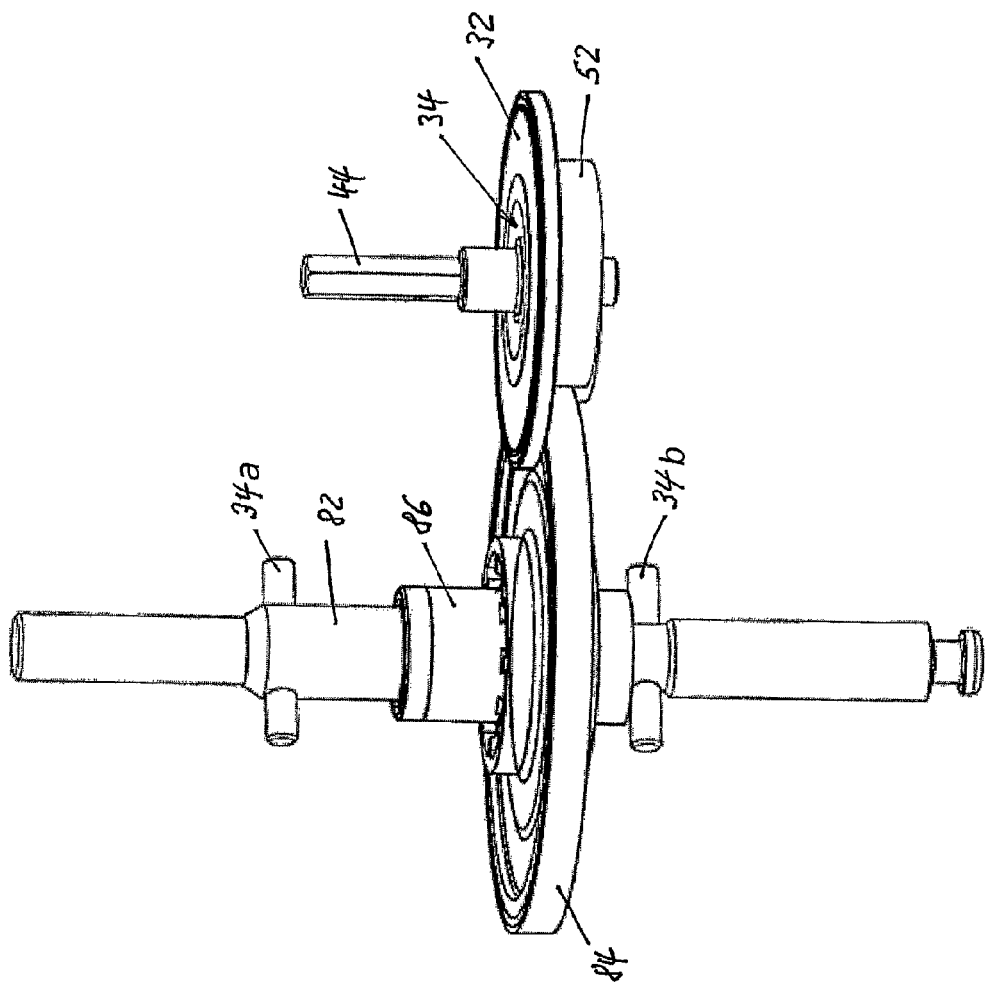
Figure 5:
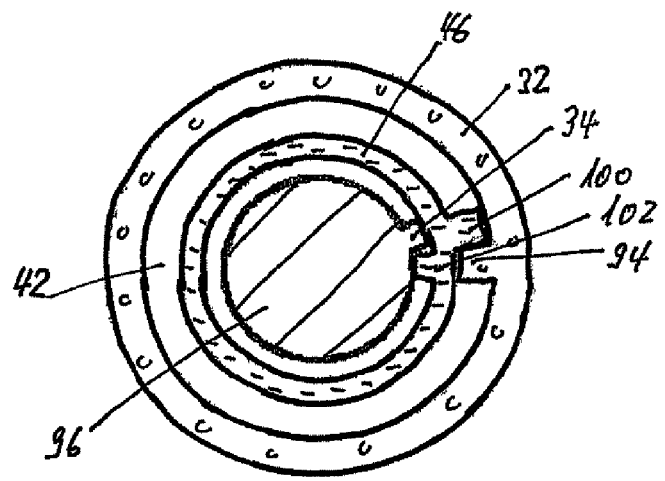
Figure 6:
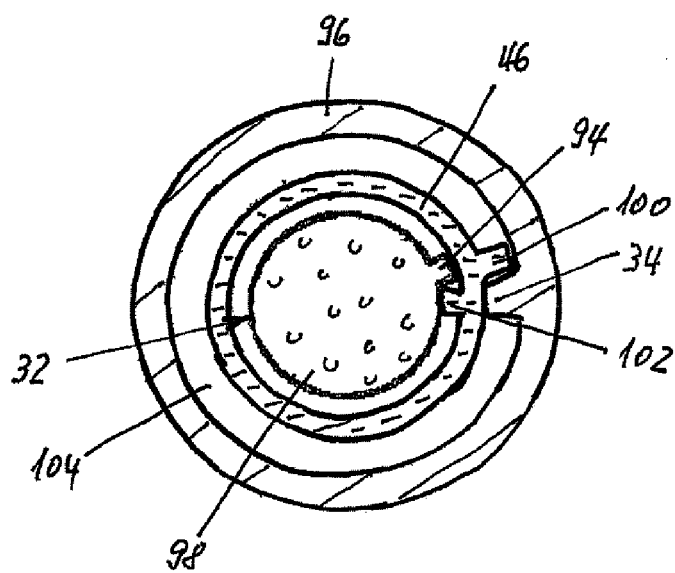
Figure 7:
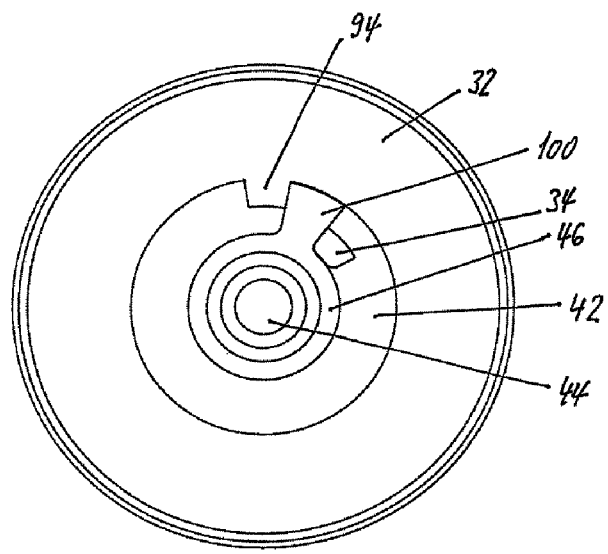
Figure 8:
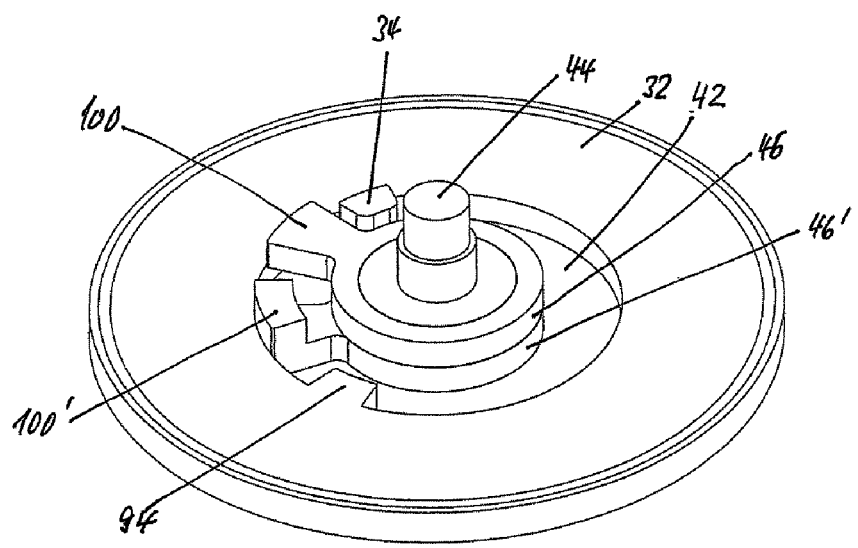
Figure 13:
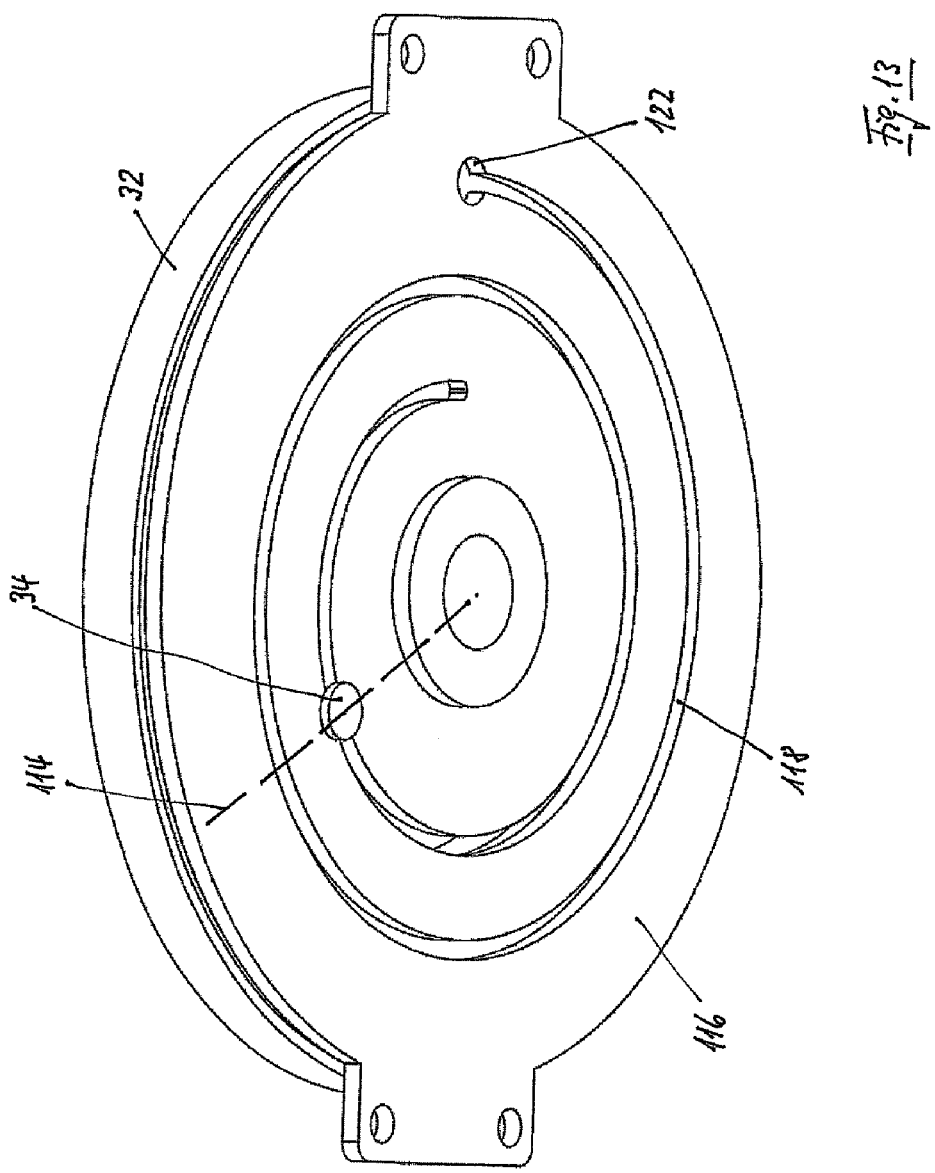

The invention will be explained in more detail with reference to exemplary embodiments which are illustrated in the drawing and which are also the subject matter of dependent patent claims. In said drawing:

FIG. 1 shows a perspective view of an actuator, from below, with a drive segment, FIG. 2 shows the actuator according to FIG. 1, from above, FIG. 3 shows a perspective view of a toothed rack with end stops, FIG. 4 shows a perspective view of a spindle wheel with end stops, FIG. 5 shows a cross section through an inner stop in the region of a stop wheel, with a trailing ring, FIG. 6 shows a variant of FIG. 5, FIG. 7 shows a further variant of FIG. 5, in a top view, FIG. 8 shows a variant of FIG. 7, with two trailing rings, in a perspective view, FIG. 9 shows the basic principle of a selection of the rotational direction, FIG. 10 shows a shifting gate with an axially displaceable shifting pinion, in a non-driven position, FIG. 11 shows an engaged shifting pinion according to FIG. 10, in the working position, FIG. 12 shows a shifting mechanism for a selection of the rotational direction, and FIG. 13 shows a perspective view of a stop wheel with a limiting gate.

FIGS. 1 and 2 show a reduction or step down gear 10 with a toothed drive element 12, which are arranged on a mounting plate 14 and form an actuator 16 which acts on a final controlling element (not illustrated) for regulating a stream of gas or fluid. The segment-shaped drive element 12 is connected in a frictionally locking and/or positively locking fashion to a hollow shaft 18 which pivots, for example, an HVAC flap, as far as a stop or through a certain angle. The hollow shaft 18 is pivotably secured in the mounting plate 14. The segment-shaped drive element 12 can, according to a variant which is not illustrated, also obviously be embodied as a spur wheel.

The reduction gear 10 is driven by an infinitely adjustable electric motor 20, in which case its drive shaft 22 with a pinion 24 for a small movement of the drive element 12 carries out a large number of the revolutions. The large step down ratio permits a relatively large preloading force to be generated with a low power electric motor 20 and, moreover, precise setting of the movements of the drive element 12. A return travel drive of the electric motor 20 is not necessary here because a selection of the rotational direction described later in detail is provided for the drive element 12. In other words, the direction of movement of the drive element 12 can be changed with the same rotational direction of the electric motor 20. In variants (not illustrated) of a reduction gear without selection of the rotational direction and without prestressing of the reduction gear, a forward travel drive and return travel drive of the electric motor 20 are necessary.

The pinion 24 of the electric motor 20 meshes with a first double spur wheel 26 whose pinion 28 itself meshes with a second double spur wheel 30. According to embodiments which are not illustrated, further analogous double spur wheels can also be installed in the reduction gear 10. As is apparent from FIG. 2, each of these double spur wheels 26, 28 . . . may be embodied structurally as a stop wheel 32 but without performing its function which is described below.

The pinion 36 of the second double spur wheel 30 meshes with a spring wheel 38 which has an axially upwardly protruding shaft 40. For the sake of clarity, the spring which is applied in a helical shape and is composed of a spring steel ribbon is not shown. Said spring has a sufficient spring force in order, in the event of a failure of the motor, to move the entire system, for example a flap in a ventilation system, from the working position into the position of rest, i.e. the closed position.

The pinion 48 of the spring wheel 38 meshes with the stop wheel 32. The latter has a coaxial, end-side cutout 42. By means of a shaft 44, the beaker-shaped cutout 42 takes up a trailing ring 46 and the end stop 34 provided on the housing. The function of the trailing ring 46 will be explained below.

According to a non-prestressed variant which is not illustrated, the pinion of the stop wheel 32 can mesh directly with the toothing of the drive element 12. As a result of this the electric motor 20 can be driven in the forward and reverse senses.

According to FIGS. 1 and 2, the step down gear 10 has a means for selecting the rotational direction. The stop wheel 32 has a shifting pinion 50 which can be moved in the direction of its shaft 44 and a spur gear 52 which is integrally formed on in the direction of the pinion 50 and has here a diameter which is approximately halfway between the diameter of the pinion 50 and that of the stop wheel 32. This integrally formed-on spur gear 52 meshes with an intermediate wheel 54 with a shaft 56 which runs parallel to the shaft 44 of the stop wheel 32 and has a shifting pinion 58 which can also be moved in the axial direction. Both pinions 50, 58 which, independently of their axial position, mesh with the toothing of the drive element 12, are stressed by a leaf spring 60. The flanges 62, 64 which project beyond the pinions 50, 58 in the radial direction are positioned in a sliding and prestressed manner on a shifting gate 66 which is essentially in the form of the segment-shaped drive element 12. At its two outer ends, the shifting gate 66 has a circular cutout 68, 70 which corresponds to the circumference of the flanges 62, 64. When the pinion 50 reaches the cutout 68 or the pinion 58 reaches the cutout 70, the leaf spring 60 presses the corresponding pinion into a cutout, corresponding thereto in the stop wheel 32 or in the intermediate wheel 54, respectively.

Each shifting pinion 50, 58 is assigned a resetting key 72, 74, which resetting keys 72, 74 can lift up the respective pinion 50, 58 and place it in a non-driven freewheel mode.

The housing (not illustrated) for the sake of clarity, is arranged on the mounting plate 14 in the usual fashion and it leaves the hollow shaft 18 free on both sides. In a variation of FIGS. 1 and 2, the hollow shaft can also be embodied into a semicircle and provided with an attachment element. Furthermore, the actuator 16 can also be embodied in two pieces, with an interface between the stop wheel 32 and the pinions 50, 58. The hollow shaft 18 with the drive element 12 then remains on the stem of the final controlling element, and the step down gear 10 with a housing can be positioned and attached as a replacement module.

FIG. 3 shows a toothed rack 120 which meshes with a coaxial spur gear 52 which is embodied in one piece with the positionally fixed stop wheel 32, and is freely movable in the longitudinal direction in a guide (not illustrated). The toothed rack 120 has end stops 34 which are arranged at both ends and which restrict the rotational range of the stop wheel 32 to at least one full revolution. The maximum possible number of revolutions is determined by the ratio of the length of the toothing 76 to the circumference of the meshing spur gear 52.

FIG. 4 shows a further variant for restricting the rotational range of the positionally fixed stop wheel 32. A coaxial spur gear 52 which is embodied in one piece with the stop wheel 32 meshes with a spindle wheel 84 with a guide sleeve 86. The internal thread of the guide sleeve 86 engages with an axially freely displaceable spindle 82 which is secured against rotation. The spindle has end stops 34*a* and 34*b* which are arranged at both ends and which limit the rotational range of the guide sleeve 86, and therefore that of the stop wheel 32 via the spindle wheel 84. The maximum possible revolutions of the stop wheel 32 can also be calculated from the geometric ratios.

FIG. 5 shows the inner part of the stop wheel 32 with a beaker-shaped cutout 42. A driver cam 94 protrudes into the cutout 42 from the stop wheel 32 in the radial direction. A bolt-shaped housing part 96 extends coaxially into the cutout 42. The bolt-shaped housing part 96 has an end stop 34 which is provided on the housing. A trailing ring 46, which rests with little play on the driver cam 94 and the end stop 34, is arranged coaxially with respect to the bolt-shaped housing part 96 and the stop wheel 32. The trailing ring 46 has an outwardly protruding transmission cam 100 and an inwardly protruding transmission cam 102. The stop system according to FIG. 5 is blocked completely in the counter clockwise direction, while in the clockwise direction the stop wheel 32 can make virtually two revolutions until the system is blocked.

FIG. 6 shows the converse situation to that in FIG. 5. An outwardly protruding driver cam 94 is formed on a spur wheel 98 of the stop wheel 32. A housing part 96 which is embodied in the form of a tube has a radially inwardly protruding end stop 34. In the interior 104 of the tubular housing part 96, a trailing ring 46 with an outer transmission cam 100 and an inner transmission cam 102 is arranged coaxially with respect to the spur wheel 98 of the stop wheel 32. The stop wheel 32 with the spur wheel 98 can make virtually two complete revolutions in the counter clockwise direction, while in the clockwise direction it is blocked.

Both according to the embodiment in FIG. 5 and to that in FIG. 6 it is possible for a plurality of trailing rings 46 to be arranged coaxially one in the other and/or one on top of the other if the transmission cams 100, 102 are embodied correspondingly.

FIG. 7 illustrates a stop wheel 32 with a coaxial, beaker-shaped cutout 42. In the radial direction, a driver cam 94 protrudes inward. An inner end stop 34 which is provided on the housing projects into the cutout 42. A trailing ring 46 which can rotate freely about the shaft 44 of the stop wheel 32 has a transmission cam 100 which extends as far as the wall of the cutout 42 which is in the form of a lateral surface, said transmission cam 100 rests on the inner end stop 34 which is provided on the housing. The stop wheel 32 is blocked with regard to rotation in the clockwise direction. In the counter clockwise direction, the stop wheel can make a virtually complete rotation until the driver cam 94 which causes it to rotate away via the end stop 34 impacts against the transmission cam 100 and entrains it for a further almost complete revolution. The transmission cam 100 which then extends further downward then impacts against the end stop 34 which is fixed to the housing, and the movement of the stop wheel 32 in the counter clockwise direction is terminated.

FIG. 8 differs from FIG. 7 in that two coaxial trailing rings 46, 46' which are arranged one on top of the other are formed. Each of the two trailing rings 46, 46' has an outwardly protruding transmission cam 100, 100'. Rotation of the stop wheel 32 in the clockwise direction is blocked. In the case of rotation in the counter clockwise direction, not only the driver cam 94 of the stop wheel 32 but also the transmission cam 100' of the trailing ring 46' can be moved beyond the inner end stop 34 which is fixed to the housing. After the almost complete, first revolution of the stop wheel 32 in the counter clockwise direction, the transmission cam 100' which is bent upward for the time being is entrained first and during the next almost complete revolution the transmission cam 100 of the second trailing ring 46 is also entrained. In the text which follows, a plurality of trailing rings are also denoted only by 46, and likewise a plurality of transmission cams are denoted only by 100.

The basic principle of the reversal of the rotational direction will be explained with reference to a drive element 12 which is embodied as a toothed segment and with reference to FIGS. 9 to 11. The two end stops 106, 108 which are customary according to the prior art remain without function. Likewise, an inner end stop 34 which is provided on the housing (FIGS. 3 to 8 and 13) in the region of the stop wheel 32 advantageously performs their function. The stop wheel 32 which is driven by the pinion 48 of the spring wheel 38 drives, via a spur gear 52 which is embodied in one piece with the latter, an intermediate gear wheel 54, of precisely the same size, in the opposite direction. The stop wheel 32 and the intermediate wheel 54 each have a shifting pinion 50, 58 which is vertically adjustable in the axial direction and both are covered by a protruding flange 62, 64. The two shifting pinions 50, 58 mesh with the toothing 76 (FIGS. 1 and 2) of the segment-shaped drive element 12, independently of the axial position. In the two end positions of the drive element 12, each with a respective cutout 68, 70 corresponding to the flanges 62, 64, a shifting pinion 50, 58 can be engaged with positively locking engagement with the spur gear 52 of the stop wheel 32 or with the intermediate wheel 54. Depending on whether one or other of the shifting pinions 50, 58 engages, the rotational direction is fixed for all the operations. For example a flap of a ventilation system is opened by means of an electric motor 20 (FIGS. 1 and 2) and the closing is carried out by means of spring force. As a result, the setting of the rotational direction takes place only once.

FIG. 10 shows a shifting pinion 50, 58 which is decoupled from a spur gear 52 of a stop wheel 32 or an intermediate wheel 54. The spur gear 52 and the intermediate wheel 54 have a blind cutout 110 which corresponds to the cross section of a shifting pinion 50, 58. A spring, usually a leaf spring, here a helical compression spring 112 in each case, presses the flange 62, 64 of the shifting pinions 50, 58 onto a shifting gate 66, which is indicated with an arrow. If the segment-shaped drive element 12 is moved into an end position, i.e. it reaches a circular cutout 68 or 70 with the respective shifting pinion 50 or 58, the helical compression spring 112 presses the respective pinion 50 or 58 into the cutout 110 which brings about positively locking engagement. When the drive element 12 pivots away from the end position, the flange 62 or 64 remains underneath the shifting gate 66 and therefore secures the shifting pinion 50 or 58 in terms of the axial position.

The unlatching of a shifting pinion 50 or 58 is also carried out in the aforementioned end position of the drive element 12. Lifting up is carried out counter to the resistance of the helical compression spring 112 and must, at any rate, be carried out utilizing the lever effect, if necessary.

FIG. 12 illustrates the switching mechanism for a means for selecting the direction of rotation. Inter alia, the shaft 44 of the stop wheel 32 and the shaft 56 of the intermediate wheel 54 are anchored in parallel on a mounting plate 14 or in a housing. The spur gear 52 of the stop wheel 32 meshes with the intermediate wheel 54 with the same diameter. The two wheels run with the same rotational speed in opposite directions. The shaft 44 also moves the shifting pinion 50 which can be displaced in the longitudinal direction, and the shaft 56 correspondingly moves the shifting pinion 58. According to the position in FIG. 12, both shifting pinions 50, 58 rest via a flange 62, 64 on a shifting gate 66 which is not shown in the drawing (FIG. 10). The shifting pinions 50, 58 are guided so that they rest on the shifting gate 66 using a leaf spring 60, and when an end position of the drive element 12 is reached the corresponding shifting pinion 50 or 58 is pressed into one of the two cutouts 110 and therefore brings about a positively locking engagement which causes the drive element 12 to move in one direction or the other.

FIG. 13 shows a further variant for limiting the number of revolutions of the positionally fixed stop wheel 32. A fixedly mounted limiting gate 116 is arranged with little play against the stop wheel 32, said limiting gate 116 having a helical guide 118 for a bolt-shaped end stop 34 of the stop wheel 32. This bolt is guided along a dashed radial guide 114 when the stop wheel 32 rotates. During mounting, the end stop 34 can be moved into the helical guide 118 through a corresponding opening 122. This opening 122 can be closed and forms one of the impact faces for the end stop 34. The other impact face is formed by the inner end of the spiral guide 118. The maximum possible number of revolutions of the stop wheel 32 is defined by the number of turns of the spiral guide 118.

The invention claimed is:
1. An actuator comprising:
 a) an electric motor,
 b) a drive element which is attachable to a final controlling element which regulates a stream of gas or fluid,
 c) a reduction gear driven by the electric motor on the drive element,
 d) a housing for the reduction gear, wherein
 e) the reduction gear has a stop wheel in positively locking engagement with the drive element,
 f) at least one end stop is provided, which interacts with the stop wheel and limits the number of revolutions of the stop wheel to more than one full revolution, and
 g) at least one trailing ring is arranged coaxially and rotatable in a cutout of the stop wheel, said trailing ring having at least one transmission cam arranged in a radial or axial direction.

2. The actuator as claimed in claim 1, wherein the cutout of the stop wheel has a radially inwardly protruding drive cam, the at least one transmission cam of said trailing ring is arranged to protrude radially outwardly and to engage with said driver cam in a positively looking fashion, and wherein an end stop is provided on the housing and is arranged on the outside of the trailing ring to engage with the transmission cam in a positively locking fashion, wherein the driver cam is rotatable beyond the end stop.

3. The actuator as claimed in claim 1, further comprising:
 a) an end stop for an outer transmission cam of said at least one trailing ring arranged in a tubular housing part having an interior space, the end stop protruding radially inwardly into the interior space,
 b) said at least one trailing ring having one radially outwardly protruding transmission cam and one radially inwardly protruding transmission cam, and
 c) a spur wheel attached to the stop wheel in a coaxial manner, said spur wheel having a radially outwardly protruding driver cam for engagement with the inner transmission cam of said at least one trailing ring.

4. The actuator as claimed in claim 3, wherein a plurality of trailing rings are arranged into each other or on top of each other, said radially outwardly protruding driver cam of said spur wheel being configured for engagement with the inner transmission cam of an innermost of said plurality of trailing rings, wherein the respective outer transmission cam of each trailing ring impacts against the respective inner transmission cam of a next trailing ring.

5. The actuator as claimed in claim 1, wherein said cutout of the stop wheel has a radially inwardly protruding driver cam, said at least one trailing ring which is arranged in the cutout and has a radially outwardly protruding transmission cam and a radially inwardly protruding transmission cam, said actuator further comprising a coaxial tubular housing part with an outwardly protruding end stop configured for engaging the inwardly protruding transmission cam of said at least one a single trailing ring.

6. The actuator as claimed in claim 5, wherein a plurality of trailing rings are arranged within each other or on top of each other and said outwardly protruding end stop of said tubular or bolt-shaped housing part is configured for engagement with the inwardly protruding transmission cam of an innermost trailing ring of said plurality of trailing rings, wherein the inner transmission cam of each trailing ring impacts an outer transmission cam of the next trailing ring.

7. The actuator as claimed in claim 1, wherein the stop wheel comprises a guide providing for a radial displacement of the at least one end stop and a limiting gate attached to a side of said stop wheel, said limiting gate including a spiral-shaped guide for the end stop.

8. The actuator as claimed in claim 1, characterized in that the at least one end stop is provided on the housing.

9. An actuator comprising:
 a) an electric motor,
 b) a drive element which is attachable to a final controlling element which regulates a stream of gas or fluid, c) a reduction gear driven by the electric motor and acting on the drive element,
d) a housing for the reduction gear, wherein
e) a stop wheel meshes with a freely running toothed rack, and
f) at least one end stop is arranged at each end of the toothed rack for limiting the number of revolutions of the stop wheel.

10. An actuator comprising:
a) an electric motor,
b) a drive element which is attachable to a final controlling element which regulates a stream of gas or fluid,
c) a reduction gear driven by the electric motor and acting on the drive element,
d) a housing for the reduction gear,
wherein
e) a stop wheel meshes with a rotatable spindle wheel which acts, via a guide sleeve with an internal thread on a longitudinally adjustable, rotationally secured spindle, and
f) the at least one end stop is arranged at an end of the spindle and limits the number of revolutions of the stop wheel.

11. The actuator as claimed in any of claim 1, 9 or 10, wherein the stop wheel meshes with a pinion of a pre-stressed spring wheel.

12. The actuator as claimed in any of claim 1, 9 or 10, wherein the housing with the reduction gear is of modular design, the stop wheel being a modular interface with the drive element and the housing having a snap-in device for providing a plug-on module.

13. The actuator as claimed in any of claim 1, 9 or 10, wherein a switching device for changing a direction of movement of the drive element is arranged between the stop wheel and the drive element.

14. An actuator comprising:
a) a drive element which is attachable to a final controlling element which regulates a stream of gas or fluid,
b) a prestressed reduction gear driven by an electric motor and acting on the drive element,
c) at least one end stop limiting the action of the reduction gear on the drive element,
d) a switching device for changing a direction of movement of the drive element, wherein the switching device has two spur gears which drive in opposing directions and which have the same diameter,
e) each of said two spur gears having a shifting pinion which can be displaced in an axial direction relative to said spur gears and which engages in a positively locking fashion with the drive element in each axial position, and
wherein
f) each one of the two shifting pinions is able to be latched fixedly to one of the two spur gears.

15. The actuator as claimed in claim 14, wherein the two spur gears have a coaxial cutout with a cross-sectional shape corresponding to the cross-sectional shape of the shifting pinions.

16. The actuator as claimed in claim 14, wherein the two shifting pinions are pre-stressed in the axial direction with a leaf spring or a helical compression spring.

17. The actuator as claimed in claim 14, wherein a shifting gate which runs along a toothing of the drive element guides the two shifting pinions.

18. The actuator as claimed in claim 17, wherein the shifting pinions have a projecting flange.

19. The actuator as claimed in claim 17, wherein cutouts are arranged at the ends of the shifting gate, said cutouts corresponding to a diameter of the two shifting pinions.

20. The actuator as claimed in claim 14, wherein a stop wheel is formed for engaging said end stop which is provided on the housing, wherein the number of revolutions of the stop wheel is limited to more than one full revolution.

21. The actuator as claimed in any one of claim 1, 9, 10 or 14, wherein the reduction gear and the electric motor are pre-mounted in the form of a module and wherein the reduction gear is pre-stressed.

22. The actuator as claimed in any one of claim 1, 9, 10, or 14 wherein the drive element is provided in the form of a drive segment, of a linear drive or of a drive spindle.

* * * * *